UNITED STATES PATENT OFFICE.

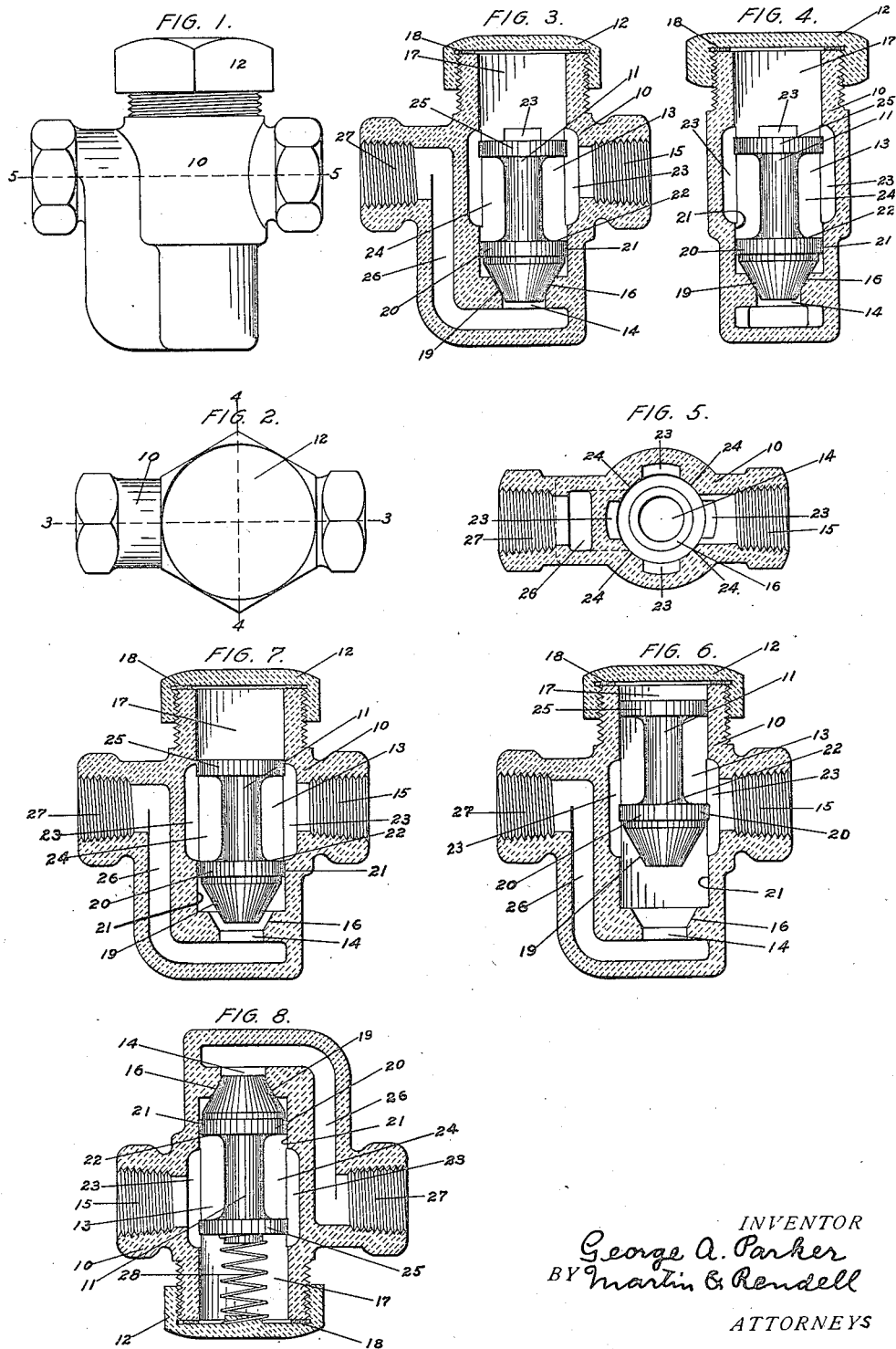

GEORGE A. PARKER, OF UTICA, NEW YORK, ASSIGNOR TO BRUNNER MANUFACTURING COMPANY, OF UTICA, NEW YORK, A CORPORATION.

CHECK-VALVE.

1,322,938. Specification of Letters Patent. Patented Nov. 25, 1919.

Application filed February 1, 1919, Serial No. 274,513.

*To all whom it may concern:*

Be it known that I, GEORGE A. PARKER, a citizen of the United States, and a resident of Utica, in the county of Oneida and State of New York, have invented certain new and useful Improvements in Check-Valves; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a check valve and especially one adapted to be inserted in the pipe line betwen a compressor and a tank or other situations where the check valve must operate upon successive pressure strokes or impulses and yet be adapted between periods of operation to form a permanent and very tight joint.

The purpose of this invention is to provide a check valve of new and improved construction and operation.

A further purpose is to provide a check valve which is simple in construction but very efficient and durable in operation and also free from noise and vibration.

Another object of my invention is to provide a check valve of such form, construction and operation that a cushion or dashpot effect is produced as the movable valve member opens whereby the opening movement of said member is retarded and cushioned toward the end of its movement and is prevented from making a striking contact with the valve casing, resulting in the valve being free from vibration, noise and wear upon the parts during the opening movement of the valve member. A still further purpose is to provide a check valve having said cushion construction so formed as to provide an elastic or resilient cushion operating against the valve member when the material being handled by the device is elastic as air or other gas whereby said cushion will tend to start the closing movement of the valve member as soon as the pressure in the valve permits said closing movement to begin.

Another purpose of my invention is to provide a check valve of such form, construction and operation that backward movement through the valve of the fluid being handled will be prevented before the valve member comes to its permanent valve seat and an appreciable movement of said valve member may thereafter be had so that in normal running conditions as where the check valve is used on the pipe line running from an air compressor to a pressure tank, the moving valve member will not come to its permanent or final valve seat after each stroke from the compressor, but will simply move toward its valve seat and then be again moved therefrom by the next succeeding pressure stroke from the compressor. In this way a check valve is provided which though operating as a check valve even during normal operation of the pump or other device to which the check valve is connected will not get a positive or striking contact of the valve member during said normal operation of succeeding strokes, but will allow the valve member to come to its permanent or final seat immediately upon the cessation of the ordinary operations. In this way not only is noise and vibration prevented on the ordinary or partial closing movements of said valve, but the contacting surfaces of the valve seat and the valve member are saved from striking each other during said normal operations and so are kept true and free from wear so that the valve member when it comes to its positive seat forms a very tight joint.

A further purpose is to provide a check valve combining said features of cushioning on the opening movement of the valve member and of absence of striking contact upon the ordinary and partial closing movement of the valve member whereby said valve is made entirely noiseless and free from vibration and free from wear of the parts during operation.

Still another object of my invention is to provide a check valve of the character above described of such form, construction and operation that the parts may be manufactured at reasonable cost and may be quickly assembled or taken apart for the purpose of repair, replacement or inspection.

Figure 1 is a side view of check valve embodying my invention.

Fig. 2 is a top view thereof.

Fig. 3 is a vertical sectional view on line 3—3 of Fig. 2, with the movable valve member in completely closed position.

Fig. 4 is a vertical sectional view at right angles to the last section, namely on line 4—4 of Fig. 2.

Fig. 5 is a horizontal sectional view on line 5—5 of Fig. 1.

Fig. 6 is a vertical sectional view similar to Fig. 3 but showing the movable valve member in open position.

Fig. 7 is a similar view of the valve, but showing the movable valve member in an intermediate position, namely closed sufficiently to prevent rearward flow of material through the valve but with the valve member not engaging its permanent or final valve seat.

Fig. 8 is a vertical sectional view of a modified form of my check valve, showing the movable valve member moved upward to closed position by a spring.

Referring to the drawings in a more particular description it will be seen that the check valve comprises three members, a chambered casing 10, a valve member 11 movably mounted therein and a cap 12. The casing 10 is provided with the main chamber 13 in which said valve member 11 slides, an inlet port 14 opening into one end of said main chamber and an outlet port 15 opening from said main chamber intermediate the ends thereof. Adjacent the inlet port 14 the casing is provided with a valve seat 16. Opposite said inlet port and valve seat the casing is provided with a pocket 17 communicating with the main chamber 13 and preferably formed as shown in the drawings as the end portion or an extension to said main chamber, said pocket 17 extending as an opening through the end of the valve casing 10.

The cap 12 closes the opering made in the end of the casing 10 by the pocket 17. This cap is removably secured to the casing preferably as shown in the drawings by having its flange screw-threaded onto the end of the casing. A packing 18 may be interposed between the inner surface of the cap and the outer adjacent end of the casing to assist in securing a tight joint.

The movable valve member 11 is slidingly mounted in the main chamber 13 and the pocket 17. It is of such shape as to have its end 19 engage and closely fit the valve seat 16 when the said movable valve member is in fully closed position. A portion 20 farther back on the said movable valve member slidingly fits the encircling part 21 of the wall of the main chamber so as to cut off the passage of fluid past said valve member while the said member is in the intermediate position shown in Fig. 7 or in any position it will occupy while it is making the first part of its movement from closed to open position and while it is making the last part of its movement from open to closed position. This is accomplished by having the portion 21 of the wall of the main chamber 13 slidingly but closely fit the portion 20 of the valve member and by having said portions 21 and 20 of such relative extent or length and so arranged relative to each other that a passage by the said portion 20 of the valve member is not afforded until the valve member has moved a considerable distance from its fully closed position.

Above the inner or upper end 22 of the closely fitting portion 21 of the casing wall, said casing wall is provided with recessed passageways 23 extending lengthwise of the casing and leaving therebetween parts 24 in line with the surface of the main chamber at its portion 21. These parts 24 therefore form guideways for the valve member. The other end 25 of the valve member is adapted to slide in and preferably closely fit the pocket 17 when the valve member is moved to intermediate and to opened position to form a cushion or dash-pot for the purpose heretofore mentioned.

A very convenient and efficient and the preferred construction of the device to effect the general result and relation of parts already pointed out is as follows: The main chamber 13 and the communicating pocket 17 will be formed with alined and parallel walls preferably circular in cross section as by being accurately bored to a given diameter with an upwardly and outwardly tapering valve seat 16 adjacent the inlet port 14. The valve member will have its lower end 19 cone-shaped to closely fit the valve seat 16 and will have its adjacent portion 20 and its other end 25 cylindrical in form, of the same diameter to closely but slidingly fit the bore of the main chamber and the pocket 17 and also the guideways 24. Preferably the valve member 11 will be spool-shaped in general appearance or reduced in diameter intermediate the end 25 and the part 20. This is partly to reduce the weight of the valve member, partly to afford more ready passage for the fluid thereby in the open position of the valve member and partly to form a balanced type of valve member.

To adapt the check valve herein described to be inserted as a unitary fitting in a straight run of pipe, the casing will have provided therein a passageway 26 extending from the inlet port 14, around the end and up the side of the casing and inside thereof to open into an internally screw-threaded aperture 27 opposite the outlet port 15 also shown as screw-threaded.

Assuming for ease and certainty of description that the device is in the relative position shown in Figs. 1 to 7, the operation of my check valve will be as follows: The weight of the movable valve member and the pressure from above keeps the valve member tightly closed until the upwardly-acting pressure at the inlet port becomes sufficient to overcome both the weight and the downwardly-acting pressure on said valve member. When the force tending to open the valve member overcomes the forces tending to keep the valve closed, the valve member moves bodily upward. At the beginning of said upward movement the cone-shaped lower end 19 of the sliding valve member leaves its seat 16 thereby affording greater area upon the valve member for the incoming pressure to exert itself against. But a clear passageway by the valve member is not afforded until the valve member has moved upward far enough for the lower cylindrical portion 20 of the valve member to be entirely clear of the encircling portion 21 of the wall of the casing. The material will then freely pass the valve by first passing into the side recesses 23 and thence either directly to the outlet port 15 or about the reduced central portion of the valve member and then to the outlet port.

Soon after the valve member has started its upward movement, the upper cylindrical portion thereof 25 passes from the guideways 24 into the pocket 17 at the upper end of the main chamber. This upper end fits closely enough in said pocket to form a dash-pot or cushion which will prevent the upper end of the valve member from making a striking contact with the upper part of the fixture which as the valve is here shown is the cap 12.

As soon as the on-coming material ceases to have pressure sufficient to hold the valve member in open position, the valve member starts to close, actuated by its weight, the back pressure from the material that has passed the valve and also if the material be air or other elastic gas from the action of the cushion formed by the end 25 of the valve member in its pocket 17.

As soon as the valve member goes down far enough to have the lower edge of its lower cylindrical portion 20 pass the upper edge of the encircling portion 21 of the casing wall, (called herein the intermediate position of the valve member), rearward movement of the material past the valve member is cut off. The valve member is still far enough up so that its bottom 19 is an appreciable distance from its valve seat 16. During normal operation of the device the valve member does not fully complete its downward movement and so does not have its bottom 19 strike its valve seat. The reasons for this are that the next succeeding pressure stroke from the compressor or pump so closely follows the last pressure stroke and the presence of the last valve on the compressor or pump (not shown) prevents the material back of the check valve from being drawn back so that there is always a very appreciable pressure on the lower side of the check valve. Of course when the compressor or pump ceases to operate for a time the valve member at once completes its downward movement and comes to the fully closed position shown in Fig. 3.

In Fig. 8 is shown a modification of my invention in that the device is shown in such position that the movable valve member tends to open instead of close by gravity, that is the valve member has to move upwardly to close. A spring 28 interposed between the now bottom of the valve member and the opposing inner face of the cap is of sufficient strength to overcome the weight of the valve member and keep the valve closed except when it is opened by sufficient pressure at the inlet port to overcome the pressure from beyond the valve. It will be seen that otherwise this modified form of my invention has the operation and advantages already pointed out as to the form shown in Figs. 1 to 7.

What I claim as new and desire to secure by Letters Patent is:

1. A check valve comprising a chambered casing having an outlet port, an inlet port, an end valve seat adjacent the inlet port and a side valve seat on the chamber wall between the end seat and the outlet port, and a valve plunger slidingly mounted in the chamber and having one end adapted to engage said end valve seat in the closed position of the plunger and having an intermediate part adapted to slidingly engage said side valve seat during the first part of the opening movement and the last part of the closing movement of the plunger whereby rearward movement of material past the plunger is cut off by the sliding engagement of the intermediate part of the plunger with said side seat before the end of the plunger engages its seat and said end of the plunger will not strike its seat during normal intermittent operation of the valve.

2. A check valve comprising a chambered casing having an outlet port, an inlet port, a valve seat adjacent the inlet port and a parallel-sided section on its inner wall between the valve seat and the outlet port, and a valve plunger slidingly mounted in the chamber and having one end adapted to engage said valve seat in the closed position of the plunger and having an intermediate part of the plunger adapted to slidingly fit said parallel-sided section of the chamber wall whereby rearward movement of material past the plunger is cut off by the sliding engagement of the intermediate part of the plunger with said parallel section of the wall before the end of the plunger engages its seat and said end will not strike its seat during normal intermittent operation of the valve.

3. A check valve comprising a chambered casing having an outlet port, an inlet port, an end valve seat adjacent the inlet port, a side valve seat on the chamber wall between the end seat and the outlet port and a pocket opposite the end valve seat and communicating with the main chamber and a valve plunger slidingly mounted in the chamber and having one end adapted to engage said end valve seat in the closed position of the plunger and having an intermediate part adapted to slidingly engage said side valve seat during the first part of the opening movement and the last part of the closing movement of the plunger whereby rearward movement of material past the plunger is cut off by the sliding engagement of the intermediate part of the plunger with said side seat before the end of the plunger engages its seat and said end of the plunger will not strike its seat during normal intermittent operation of the valve, the other end of the plunger being adapted to enter said pocket as the plunger moves from closed position whereby a cushion or dash-pot is formed and said plunger is prevented from striking the casing on its opening movement.

In witness whereof I have affixed my signature this 30th day of January, 1919.

GEORGE A. PARKER.